United States Patent Office 3,268,618
Patented August 23, 1966

3,268,618
POLYMERIZATION PROCESS USING CHLORINATED ALUMINA CATALYST
John Vincent Fletcher and Anthony George Goble, Sunbury-on-Thames, England, assignors to The British Petroleum Company Limited, London, England, a British joint-stock corporation
No Drawing. Filed May 8, 1963, Ser. No. 279,013
Claims priority, application Great Britain, May 15, 1962, 18,626/62
3 Claims. (Cl. 260—683.15)

This invention relates to a novel polymerization process.

According to this invention there is provided a process which comprises contacting a polymerizable organic compound with a chlorinated catalyst obtained by contacting a chlorinatable inorganic oxide with a compound containing the group

Preferably the chlorinatable inorganic oxide is a refractory oxide selected from groups III to V of the Periodic Table, for example alumina, boria, silica, titania, or zirconia. A mixture of two or more inorganic oxides, or a compound obtained by reaction of said mixture, may be used if desired.

When alumina is used in the formation of the catalyst this alumina will preferably contain some hydrogen. This is a characteristic of activated aluminas which although predominantly alumina do contain a small amount of hydrogen, usually less than 1% wt. This hydrogen is generally considered to be in the form of surface hydroxyl groups, and it is believed that the chlorine compound introduces chlorine into the alumina at the positions of at least some of the original surface hydroxyl sites to form the active catalyst sites.

Any of the forms of alumina suitable as a base for reforming catalysts may be used, but a particularly preferred form is one derived from an alumina hydrate precursor in which the trihydrate predominates. One containing a major proportion of beta-alumina trihydrate is particularly suitable. A convenient method of preparing the alumina is by hydrolysis of an aluminium alcoholate, for example, aluminium isopropoxide, in an inert hydrocarbon solvent, for example, benzene. Other things being equal, the greater the amount of chlorine taken up by the alumina, the greater is the activity of the catalyst and since, as stated above, the maximum amount of chlorine which can be added is related to the surface area, it is desirable that the alumina should have a high surface area, for example more than 250 sq. metres/gram and preferably more than 300 sq. metres/gram.

Suitably the chlorinatable inorganic oxide, before chlorination, is treated with an alkali metal compound or alkaline earth metal compound under conditions such that alkali metal or alkaline earth metal is retained by the oxide.

Preferably the alkali metal compound or alkaline earth metal compound which is used in the formation of the catalyst is an ionic compound. Preferably this compound is a compound which is capable of providing metal cations under the conditions under which it is brought into contact with the inorganic oxide or under conditions employed subsequently but prior to chlorination of the catalyst.

The precise way in which the addition of an alkali metal or alkaline earth metal acts to alter the activity of the catalyst is not known for certain but it is believed that the metal cation combines in some way with the inorganic oxide. Preferably therefore the oxide is treated after the contacting to dissociate the alkali metal compound or alkaline earth metal compound, for example by calcination, and the compound used is preferably one which can be dissociated without leaving other elements on the oxide. Particularly suitable compounds are salts of organic acids, particularly carboxylic acids, for example formates, acetates and oxalates. The alkali metal compound or alkaline earth metal compound may conveniently be added to the inorganic oxide by impregnation using a solution of the compound. The amount of alkali metal or alkaline earth metal retained may be small in relation to the amount of inorganic oxide, for example in the range 0.01–10% wt. by weight of inorganic oxide. The minimum amount necessary in any given application to render the catalyst selective may be determined by experiment. Metal present in excess of this minimum amount is not deleterious and it has been found that appreciable amounts of chlorine can be taken up by oxides containing for example 4% by wt. or higher of alkali metal.

Preferably the catalyst is obtained by contacting the treated inorganic oxide, at elevated temperature, with the vapour of a compound of general formula:

where X and Y are the same or different and are selected from H, Cl, Br, F or SCl, or where X and Y together are O or S. However, if desired other halogen containing agents may be used.

Preferably the compound employed is one in which the group >CCl$_2$ is not directly attached to a carbon atom.

The subsequent chlorination is essentially the same as that disclosed in co-pending U.S. patent application Serial No. 135,426, filed September 1, 1961. Suitable compounds having the required structural formula are:

Carbon tetrachloride (CCl$_4$)
Chloroform (CHCl$_3$)
Methylene chloride (CH$_2$Cl$_2$)
Dichlorodifluoromethane (CCl$_2$F$_2$)
Trichlorobromomethane (CCl$_3$SCl)
Phosgene (COCl$_2$)
Thiophosgene (CSCl$_2$)

The first three compounds listed are preferred. In the case of compounds containing elements other than chlorine, carbon and hydrogen, the treatment may add the other elements to the catalyst in addition to the chlorine. For example treatment with dichlorodifluoromethane results in the uptake of both chlorine and fluorine onto the catalyst. The presence of these other elements does not affect the activity conferred by the chlorine, but it may confer other properties and care should, therefore, be exercised to ensure that the selectivity of the catalyst is not affected. Small amounts of halogen (including chlorine) may also be present in the catalyst prior to the chlorination. Thus the inorganic oxide subjected to the process of the present invention may be a platinum-alumina catalyst containing up to 1% wt. of halogen such as is normally used for the reforming of gasoline boiling range hydrocarbons.

Preferably the temperature, time of contact and amount of chlorine-containing compound used in the formation of the catalyst are such that the up-take of chlorine is at least 1% by weight. Since the chlorination is essentially a surface phenomenon the amount of chlorine which can be added without the formation of free metal halide is related to the surface area of the catalyst; the greater the surface area, the greater is the amount of chlorine which can be added without the formation of free chloride; this is usually at least half the amount which could have been added without the formation of free chloride if the catalyst had not been treated with an alkali metal or alkaline earth metal.

The non-reducing conditions used for the chlorination may be either inert or oxidizing conditions, the latter being preferred since they give catalysts which lose activity more slowly during low temperature isomerisation. A convenient method of contacting the metal oxide is to pass a gaseous stream of the chlorine compound over the metal oxide either alone or, preferably, in a non-reducing carrier gas. Examples of suitable carrier gases are nitrogen, air or oxygen.

Non-reducing conditions are preferred since, in the case of some catalysts, reducing conditions tend to convert the chlorine compound to hydrogen chloride, which gives an inactive catalyst. The temperature for the halogenation may be from 200–1100° F. and preferably from 300–1100° F. (149–593° C.). The tendency when using alumina to form free aluminium chloride increases with temperature and care should, therefore, be exercised when using the higher temperatures within the stated range. Since the temperatures used will normally be above the volatilisation temperature of aluminium chloride the formation of free aluminum chloride is readily detected by its appearance in the gaseous reaction products. When treating a platinum group metal-alumina composite, care should also be exercised to prevent the formation of volatile platinum complexes, the tendency for the formation of such complexes again increasing with increasing temperature. When treating platinum group metal-alumina composites the temperature is preferably 300–700° F. (149–371° C.), platinum-on-alumina composites being more particularly treated at 450–600° F. (232–316° C.) and palladium-on-alumina composites at 500–650° F. (260–343° C.). The chlorination reaction is exothermic and the temperatures specified are the initial temperatures used.

The rate of addition of the chlorine compound is preferably as low as practicable to ensure uniform chlorination and to avoid a rapid increase of temperature as a result of the exothermic reaction. Preferably the addition rate does not exceed 1.3% wt. of chlorine compound by weight of catalyst per minute. If a carrier is used, the rate of flow is preferably at least 200 volumes/volume catalyst/hour and a convenient range is 200–1000 v./v./hr. The pressure used is conveniently atmospheric.

The active catalyst is susceptible to hydrolysis in the presence of water and should, therefore, be stored under anhydrous conditions. Similarly the materials used in the catalyst preparation should also be free from water.

Suitable conditions for forming the catalyst are described in co-pending U.S. patent application Serial Nos. 135,426, filed September 1, 1961 and 239,048, filed November 20, 1962.

Within the term "polymerizing" we include co-polymerizing.

Polymerizable compounds which may be employed include mono-, di- and poly-olefins, acetylenes and organic compounds containing a functional group and an olefinic and/or acetylenic linkage. A particularly suitable class of compounds are the alpha olefins of general formula $R-CH=CH_2$ where R is an alkyl, cycloalkyl or aryl group. Particularly suitable polymerizable compounds are ethylene, propylene, butene-1, 4-methylpentene-1, butadiene, isoprene and styrene. Polymerization may be carried out batchwise or continuously using, for example, a fixed bed, moving bed or suspended catalyst.

Preferably the reaction will be carried out in the presence of a diluent. Suitably the diluent will be a solvent for at least part of the product.

Usually the process will be carried out in the absence of catalyst components which, in the presence of the catalyst hereinbefore described, would lead to the production of a substantial proportion of high molecular weight polymers. Suitably the process will be carried out in the presence of a catalyst containing as the sole active ingredient, the product obtained by treating a halogenatable inorganic oxide with a halogenated organic compound as hereinbefore defined. Under these conditions the main product will be liquid polymers for example, according to the nature of the monomer and polymerization conditions, dimers, trimers and/or tetramers.

High boiling products may also be obtained; depending on molecular weight these products may find application as one or more of the following materials: caulking materials, sealing materials, adhesives, thickening agents and viscosity index improvers.

The process of the invention is particularly suitable for use in the conversion of 4-methylpentene-1 to polymers having carbon numbers in the range 12–18. In particular, the process may be employed to obtain good yields of 4-methylpentene-1 dimer.

Thus preferably there is recovered from the polymerization product at least one hydrocarbon having 12–18 carbon atoms per molecule. Preferably there is recovered from the polymerization product a liquid polymer fraction consisting of polymers having more than 18 carbon atoms per molecule.

The preferred catalyst consists of a chlorinated alumina containing about 10–13 percent weight of chlorine, and produced by treating an alumina, of surface area in excess of 300 square metres/gm., with carbon tetrachloride, at elevated temperatures.

Preferred conditions for the production of these $C_{12}$–$C_{18}$ polymers comprise a temperature in the range ambient to 200° C. Preferably the pressure lies in the range atmospheric to 1000 lbs./sq. in. g. Space velocity will usually lie in the range 0.1 to 10.0 v./v./hr.

The invention is illustrated but not limited by the following examples.

*Example 1*

100 ml. of a commercial alumina, having a BET surface area of about 400 sq. metres per gram, was purged with dry nitrogen at 300° C. for 30 minutes before being treated at 300° C. with 20 ml. of dry carbon tetrachloride, added dropwise over a period of 20 minutes. The nitrogen flow rate was about 300 ml./min. and this was maintained during the carbon tetrachloride addition, and for a further 30 minutes after it.

The resulting chlorinated alumina was then used to process 4-methylpentene-1 (85 mol percent pure) under the conditions and with the results given in the following Table I.

TABLE I

| Hours on stream | 2–3 | 6–7 | 9–10 | 12–13 | 14–15 |
|---|---|---|---|---|---|
| Pressure (N₂) p.s.i.g | 100 | 100 | 100 | 100 | 100 |
| Temperature, ° C | 107 | 106 | 127 | 126 | 129 |
| LHSV, v./v./hr | 1.1 | 2.05 | 1.0 | 2.05 | 4.1 |
| Liquid Recovery, percent wt | 95.9 | 96.4 | 98.5 | 96.4 | 96.4 |
| Product Composition: | | | | | |
| C₆ monomer, percent wt | 31.0 | 52.9 | 32.0 | 46.9 | 54.2 |
| C₁₂ dimer (B.P. 180°–220° C.), percent wt | 19.5 | 15.0 | 20.7 | 17.6 | 17.2 |
| >C₁₂ dimer, percent wt | 49.5 | 31.2 | 47.3 | 35.5 | 28.6 |
| Total conversion, percent | 69.0 | 47.1 | 68.0 | 53.1 | 45.8 |
| Dimer Selectivity, percent | 28.3 | 31.8 | 30.4 | 33.1 | 37.6 |
| Bromine Number of— | | | | | |
| Dimer | 97.9 | | | | |
| Residual Polymer | 60.9 | | | | |

*Example 2*

4-methylpentene-1 (ca. 95 mol percent purity) was polymerized, over a catalyst prepared as described in Example 1, at 100 lbs./sq. in. of nitrogen pressure, 2.0 v./v./hr. and a temperature of 110° C.

During a 7 hour run the liquid recovery was greater than 95% and no catalyst deactivation was observed.

1300 grams of the product was fractionated first in a 100 plate column, then in a spinning band column and finally in a rota-film molecular still. The yields of fractions obtained were as follows:

| | Percent wt. |
|---|---|
| C₆ monomer | 37.8 |
| C₁₂ dimer | |
| B.P. 187–221° C. | 12.7 |
| B.P. 221–278° C. | 8.0 |
| Combined fractions ex spinning band B.P. 296–396° C. | 17.6 |
| Combined fractions ex rota-film B.P. 440–ca. 760° C. | 18.8 |
| Residue, ca. 760° C. | 4.9 |

Eleven fractions were obtained from the spinning band column; selected fractions were analyzed and had the characteristics shown in the following Table 2.

TABLE 2

| Number | 1 | 3 | 5 | 7 | 9 | 11 |
|---|---|---|---|---|---|---|
| Kinematic Viscosity, c.s.: | | | | | | |
| At 100° F | 5.86 | 13.61 | 17.79 | 22.05 | 52.66 | 78.29 |
| At 140° F | 3.39 | 6.61 | 8.02 | 9.50 | 18.45 | 22.51 |
| At 210° F | 1.74 | 2.78 | 3.22 | 3.64 | 5.70 | 6.63 |
| Viscosity Index | 63 | 24 | 16 | 14 | 21 | 26 |
| Pour Point, °F | <−70 | <−70 | <−70 | <−70 | −35 | −35 |
| Molecular Weight | 259 | 317 | 329 | 349 | 403 | 430 |

Eight fractions and a residue was obtained from the rota-film molecular still. Fractions 2–8 and the residue had the properties shown in Table 3.

TABLE 3

| Fraction Number | 2 | 3 | 4 | 5 | 6 | 7 | 8 | Residue |
|---|---|---|---|---|---|---|---|---|
| Kinematic Viscosity, c.s.: | | | | | | | | |
| At 100° F | 137.2 | 227.8 | 546.9 | 1,321 | 2,212 | 4,129 | 6,644 | 37,300 |
| At 140° F | 38.83 | 59.19 | 120.8 | 249.1 | 384.6 | 645 | 950.5 | 4,623 |
| At 210° F | 9.25 | 13.07 | 21.8 | 37.2 | 50.68 | 75.66 | 101.8 | 379.2 |
| Viscosity Index | | 25 | 27 | 37 | 42 | 53 | 59 | 96 |
| Pour Point, °F | −15 | −15 | 5 | 15 | 20 | 30 | 40 | 50 |
| Molecular Weight | 483 | 530 | 632 | 799 | 837 | 953 | *1,050 | *1,670 |

* Extrapolated values.

The residue fraction was found to have properties by which it is suitable for use as a viscosity index improves when used with a lubricating oil base.

We claim:

1. A polymerization process for polymerizing alpha mono-olefinic hydrocarbons which comprises contacting at a temperature between ambient and 200° C. a feedstock comprising a major proportion of alpha mono-olefinic hydrocarbons having less than about eight carbon atoms with a chlorinated catalyst obtained by contacting alumina with a compound of the general formula

where X and Y are the same or different and are selected from H, Cl, Br, F or SCl, or where X and Y together are O or S, under non-reducing conditions and at a temperature in the range of from 200°–1100° F. such that at least 1% chlorine is taken up by the oxide without the production of free chloride.

2. A process according to claim 1 in which the chlorine containing compound is selected from the group consisting of carbontetrachloride, chloroform and methylene chloride.

3. A process according to claim 1 in which the alumina has a surface area in excess of 300 sq. meters/g. and wherein the chlorine content of the alumina is about 10–13% of chlorine.

References Cited by the Examiner

UNITED STATES PATENTS 2,830,106  4/1958  Good et al. _____ 260—683.15
3,138,559  6/1964  Hauptschein et al. ___ 252—442

FOREIGN PATENTS 1,299,388  6/1962  France.
1,326,951  4/1963  France.

DELBERT E. GANTZ, *Primary Examiner.*

R. H. SHUBERT, *Assistant Examiner.*

UNITED STATES PATENT OFFICE
CERTIFICATE OF CORRECTION

Patent No. 3,268,618                August 23, 1966

John Vincent Fletcher et al.

It is hereby certified that error appears in the above numbered patent requiring correction and that the said Letters Patent should read as corrected below.

Column 1, lines 18 to 22, for

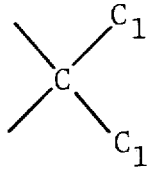      read      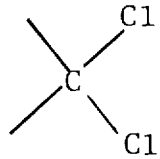

column 4, in TABLE I, third column, under the heading "6-7", line 10 thereof, for "31.2" read -- 32.1 --; column 6, line 2, for "viscosity index improves" read -- viscosity index improver --.

Signed and sealed this 26th day of September 1967.

(SEAL)
Attest:

ERNEST W. SWIDER            EDWARD J. BRENNER
Attesting Officer            Commissioner of Patents